United States Patent [19]

Lymons

[11] Patent Number: 4,629,146

[45] Date of Patent: Dec. 16, 1986

[54] HOLD OPEN ROD FOR HINGED SECTION OF NACELLE SYSTEM

[75] Inventor: Dennis E. Lymons, San Diego, Calif.

[73] Assignee: Rohr Industries, Inc., Chula Vista, Calif.

[21] Appl. No.: 696,445

[22] Filed: Jan. 30, 1985

[51] Int. Cl.⁴ ............................................... B64C 7/02
[52] U.S. Cl. .............................. 244/53 R; 244/129.4; 244/129.5; 180/69.2; 248/352; 248/354.1
[58] Field of Search ............... 244/129.1, 129.4, 129.5, 244/53 R; 180/69.2, 69.21; 248/408, 351, 352, 353, 354.1, 354.6; 285/303, 317, 320; 403/327, 330

[56] References Cited

U.S. PATENT DOCUMENTS

| | | | |
|---|---|---|---|
| 1,598,868 | 9/1926 | Lundelius | 180/69.21 |
| 2,178,998 | 11/1939 | Scott | 180/69.21 |
| 2,205,683 | 6/1940 | Claud-Mantle | 180/69.2 |
| 2,229,506 | 1/1941 | Johnson | 180/69.2 |
| 2,235,496 | 3/1941 | Greig | 180/69.21 |
| 2,514,095 | 7/1950 | Schreiber | 248/352 |

Primary Examiner—Galen Barefoot
Assistant Examiner—Rodney Corl
Attorney, Agent, or Firm—Patrick J. Schlesinger; Frank D. Gilliam

[57] ABSTRACT

A hold open rod for holding open a hinged section of a nacelle system for maintenance. The rod includes a tubular member connected to the hinged section and a rod which telescopes within the tubular member and which is connected to the engine contained within the nacelle system. The hold open rod is provided with a novel locking feature which permits telescoping of the rod member within the tubular member only when the hinged section is opened further to permit manual disengagement of a latch member locking the rod member within the tubular member.

5 Claims, 6 Drawing Figures

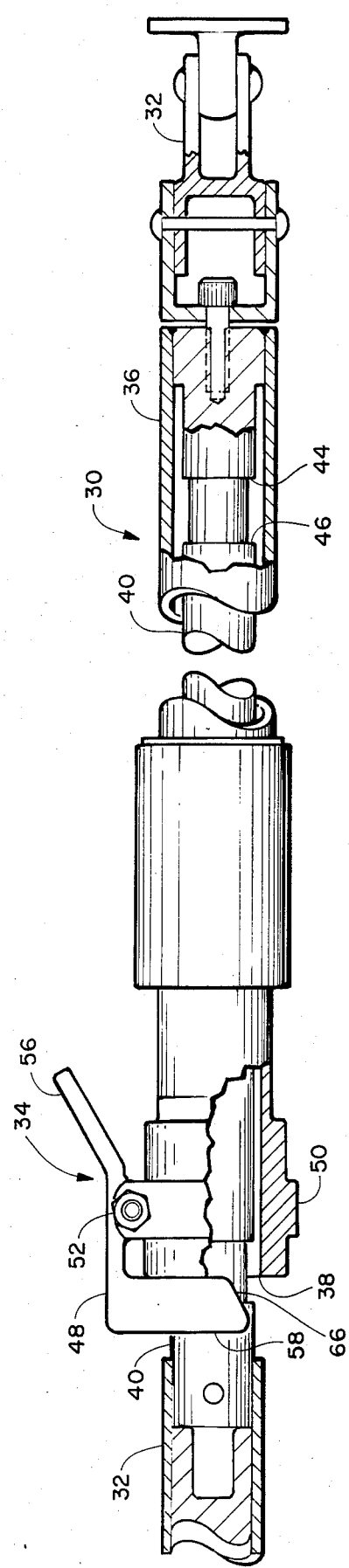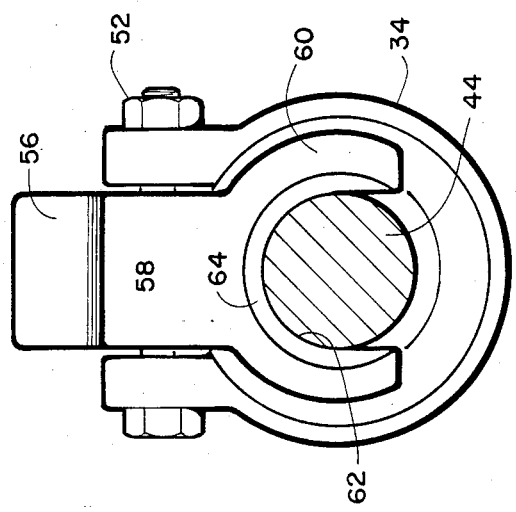
FIGURE 3
FIGURE 4

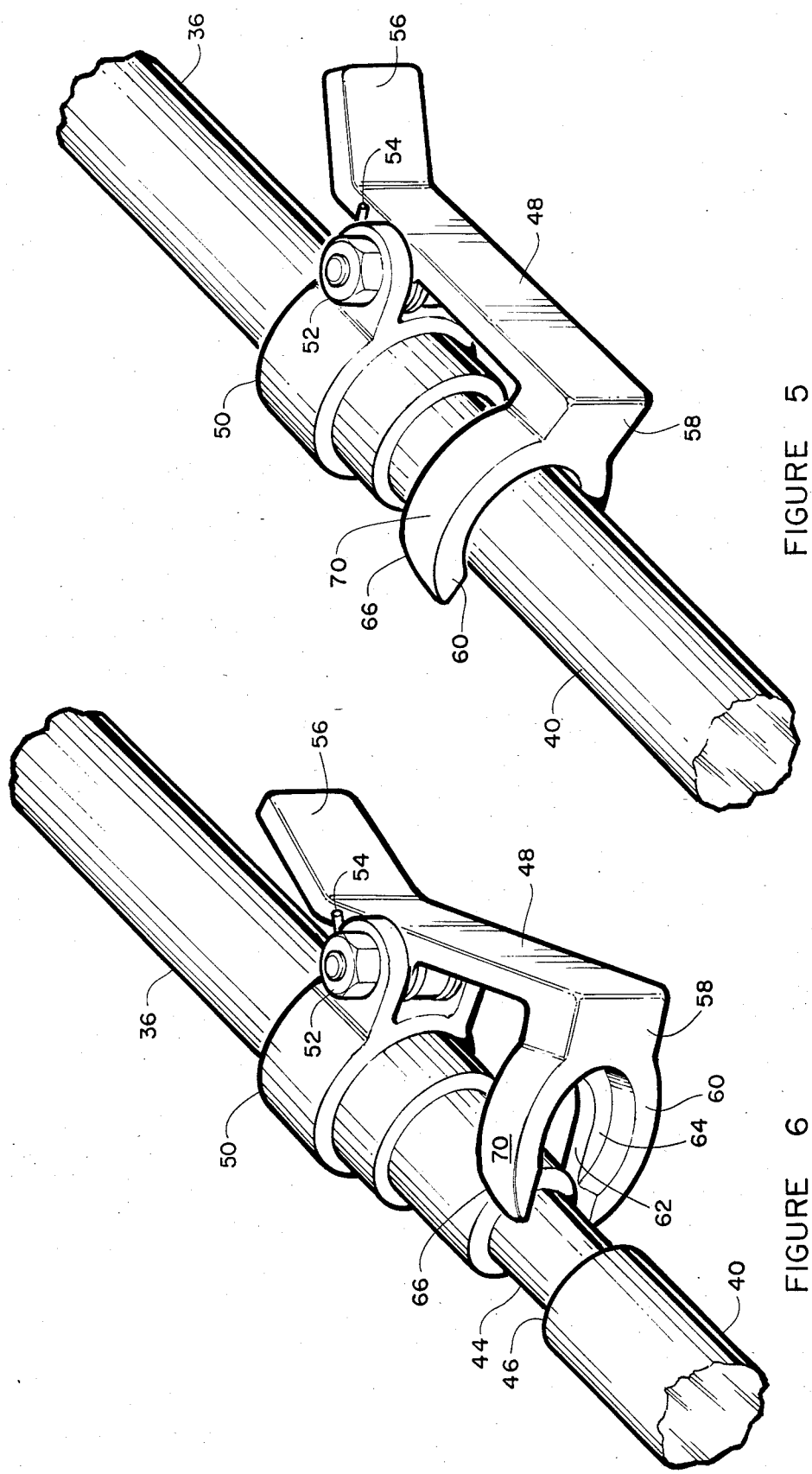

HOLD OPEN ROD FOR HINGED SECTION OF NACELLE SYSTEM

FIELD OF THE INVENTION

This invention relates to improvements in nacelle systems and, more particularly but not by way of limitation, to a hold open rod for a hinged section of a nacelle system for an aircraft jet engine.

BACKGROUND OF THE INVENTION

Large commercial aircraft are commonly powered by extremely large turbofan jet engines. Such jet engines are commonly connected to a wing through a suitable pylon, if wing mounted, and have a suitable nacelle system which encloses and streamlines the aircraft jet engine. Such nacelle systems are broadly considered to include a nose cowl, a fan cowl, a core cowl, and a thrust reverser. The fan cowl, the thrust reverser and the core cowl are commonly hinged so that when it is necessary to perform maintenance or to have other required access to the engine or to the nacelle system itself when the aircraft is on the ground, the hinged portion may be opened in order to afford such access.

In the U.S. Pat. No. 3,511,055, issued to R. H. Timms on May 12, 1970 for THRUST REVERSER, it will be seen that it is common to hinge such sections of the nacelle system along the upper spine of the nacelle system. A bifurcated hinged section can then be unlocked along a lower spine and opened a predetermined distance to afford easy access to the engine. In order for the hinged section to remain open, a suitable hold open rod is provided. This hold open rod is carried within the nacelle system and then used to hold the hinged section open as required.

Difficulties have been encountered in the manufacture and use of such hold open rods since they are subject to frequent failure in the field. Because of space requirements, such hold open rods are often collapsible, and in use are prone to collapse at inopportune times. Because the hinged sections of the nacelle system have now grown to be quite large, the collapse of a hold open rod and the unexpected closing of the hinged section of the nacelle system can cause severe injury to a workman who is engaged in working on an engine while a hinged section of the nacelle system is open. Prior to the present invention, no hold open rod had been presented that was simple and inexpensive to manufacture and which afforded a high degree of safety and use.

The prior art reveals a number of devices that are used to adjustably position a telescoping structure to a predetermined height. Examples of these patents are seen in U.S. Pat. Nos. 2,514,095; 2,820,626; 1,725,312; 1,890,423; 2,844,348; and 2,605,117. German patent No. 866,544 issued July 8, 1949 was concerned with a similar subject. The Schreiber U.S. Pat. No. 2,514,095 is typical of this prior art. The Schreiber patent discloses an adjustable trestle jack having a swing hook which is selectively positioned within anyone of the number of annular grooves provided at intervals within a central plunger shaft. While such a device is satisfactory for a trestle jack where an object is held at a predetermined height, it does not meet the requirements for a hold open rod for hinged sections of a nacelle system of an aircraft jet engine. Due to the large area of such hinged sections, they can be raised by a sudden gust of wind thereby allowing a lock in a hold open rod to disengage or a workman engaged in maintenance of the engine can inadvertently strike a hold open rod thereby disengaging a lock feature. Thus, because of the inadvertent contact with the hold open rod by a workman or an unexpected movement of the hinged nacelle section itself it is necessary to provide a hold open rod having a locking mechanism which is ultra safe in operation. It is believed that such an ultra safe operation is provided by the present invention.

SUMMARY OF THE INVENTION

Briefly stated, the present invention provides for a nacelle system for an aircraft engine having a plurality bifurcated sections that are hinged along a longitudinal upper spine and that are locked together along the longitudinal lower spine, a hold open rod adapted to be collapsed and stored within the nacelle system during flight and to be extended and locked in a position to hold open a hinged nacelle section system to permit access to the jet engine elements of the nacelle system as may be required on the ground. The rod includes a tubular member that is swivably connected at one end to a hinged portion of the nacelle system. A rod member is slidably positioned within the tubular member and swivably connected at one end to the jet engine. A locking means cooperates with the tubular member and the rod member to lock the hinged portion of the nacelle system in a open position. The locking means requires the hinged portion of the nacelle system to be more fully opened to permit the locking means to be unlocked and the rod member to be collapsed within the tubular member to permit the closing and locking of the hinged nacelle portion and stowing of the hold open rod. The hold open rod will not collapse if the hinged portion of the nacelle system is raised without the locking means being disengaged. Similarly, the hold open rod will not collapse if the locking means is attempted to be disengaged without simultaneously raising the hinged section of the nacelle system.

BRIEF DESCRIPTION OF THE DRAWINGS

The above mentioned aspects of the invention will become readily apparent from the following detailed descriptions when read in conjunction with the next drawings and which like parts have like numbers and in which:

FIG. 3 is a side view seen partially in section of a hold open rod embodying the present invention.

FIG. 4 is a sectional view taken along Lines 4—4 of FIG. 3.

FIG. 5 illustrates the locking feature of the hold open rod of the present invention in a partially unlocked condition.

FIG. 6 illustrates the locking feature of the present invention in a fully unlocked condition.

DETAILED DESCRIPTION OF THE DRAWINGS

Figure 1:
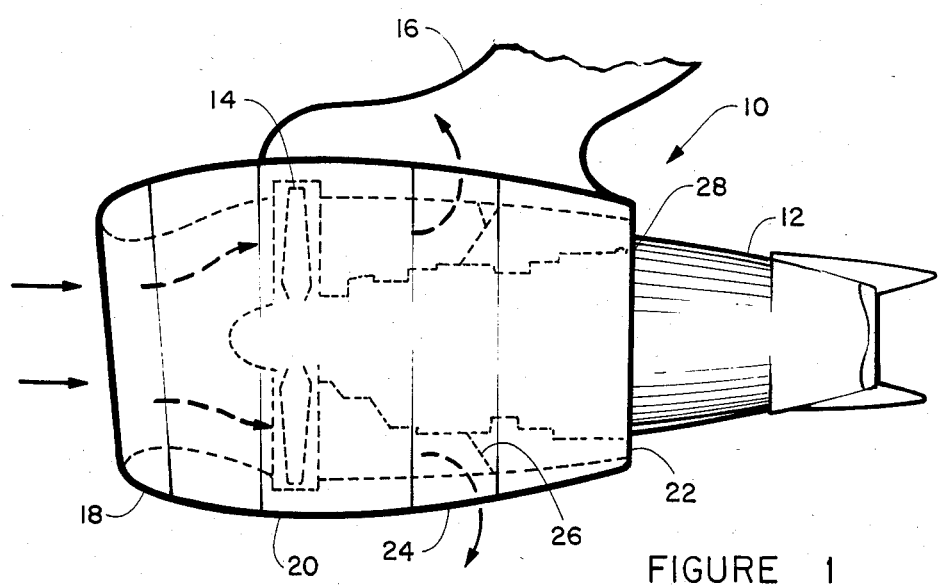
FIG. 1 is a simplified idealized representation of a nacelle system for an aircraft jet engine.

Referring now to the drawings in detail, and in particular to FIG. 1, reference character 10 generally designates a nacelle system for an aircraft jet engine for a large airplane. Since the particular details of the jet engine and the associated nacelle system are only described to define the environment in which the novel hold open rod of the present invention operates, they will be described in only the most elementary terms. A jet engine 12 is provided with a large bypass turbofan 14 at its forward end. The nacelle system 10 and the jet engine 12 are connected to an aircraft (not shown) by a suitable pylon 16. The nacelle system includes a nose cowl portion 18, a fan cowl portion 20, and a thrust reverser 22. Thrust reverser 22 includes a translatable portion 24, which translates aft to uncover suitable blocker doors 26, which direct the bypass air outwardly and forwardly. The nacelle system 10 further includes a core cowl 28.

Figure 2:
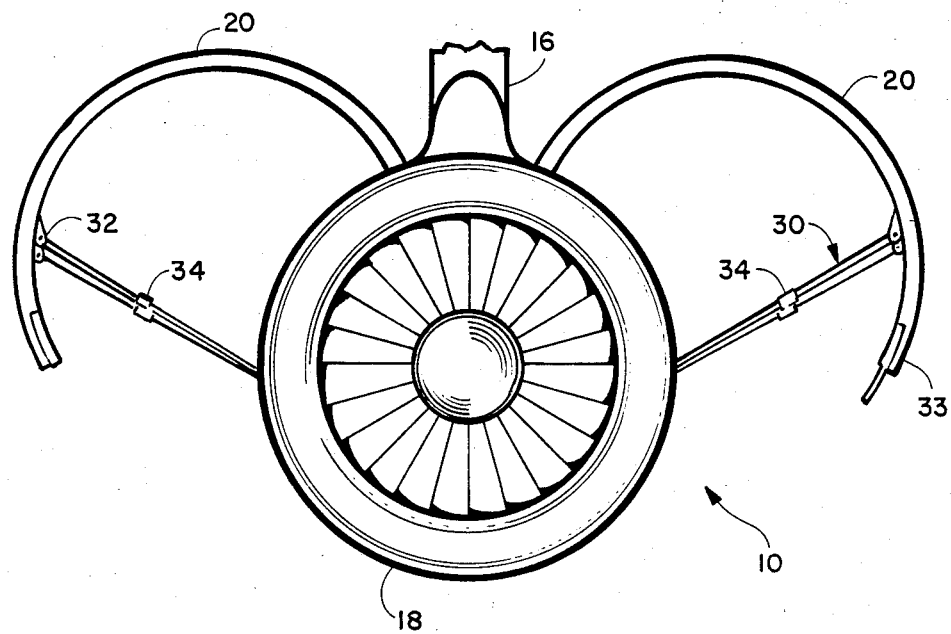
FIG. 2 is an idealized representation of a nacelle system for an aircraft jet engine illustrating a hold open rod embodying the present engine being used to hold open hinged sections of the nacelle system.

Referring now to FIG. 2, it will be seen that the bifurcated sections of the fan cowl 20 of the nacelle system 10 have been opened and are being held open by the hold open rod 30 of the present invention. The fan cowl 20, the thrust reverser 24, and the core cowl 28 are generally bifurcated and hinged along an upper longitudinally extending spine as per U.S. Pat. No. 3,511,055 and are lockable by suitable lock means 33 along a lower longitudinally extending spine. The hold open rod is swivably connected by a swivable means 32 at one end to the engine casing and at the other end to a hinged section of the nacelle system when a hinged section has been opened for a desired purpose. When the hinged section is to be closed, one of the swivable connections 32 is disengaged for stowing of the hold open rod 30 within the nacelle system during flight operation.

The hold open rod 30 is provided with a novel locking means 34 which precludes an unexpected collapsing of the hold open rod 30 while being used. FIG. 2 illustrates both a forward and aft hold open rod 30 being used for each hinged section of the nacelle system 10.

In FIG. 3 it will be seen that the novel hold open rod 30 of the present invention includes a suitable tubular member 36 which is adapted to be connected at one end by means of a swivable connection 32 to a hinged section of the nacelle system. The tubular member 36 is provided with an end face 38 that is normal to the longitudinal axis of the tubular member 36. A rod member 40 is slidably positioned within the tubular member 36. The rod member 40 is provided with a swivable connecting means 32 which is adapted to connect the hold open rod 30 to the casing of the engine 12. The rod member 40 is provided with a annular groove relieved portion 44 which has at least one surface 46 which is normal to the longitudinal axis of the rod member 40.

The locking means 34 includes a latch member 48 which is connected to the tubular member 36 in a suitable manner. In the illustrated embodiment of the invention, this may take the form of a a circular strap member 50 which is secured to the tubular member 36 and which carries a suitable bolt member 52, on which the latch member 48 is swivably journaled. A suitable spring 54 biases the latch member 48 toward a closed position. The latch member 48 is provided with a generally upwardly extending portion 56 which is adapted for use in opening of the latch means 34. In the view of FIG. 3, the hold open rod 30 is shown in its collapsed position and the locking means 34 is shown in an unlocked position, since it is engaging a relieved portion 58 of the rod member, for ease in stowing of the rod 30.

Referring now to FIG. 5, the locking feature 34 of the novel hold open rod 30 will be described in greater detail. The latch member 48 is provided with an inwardly extending prong portion 58 which is provided with two curvilinear arm portions 60 which partially encircle the rod member 40. The prong portion 58 and associated arm members 60 are provided with inner annular relieved portion 62 which can be seen most clearly in FIGS. 4 and 6. The inner annular relieved portion 62 provides an inner surface 64. The surface 64 is adapted to cooperate and contact surface 46 of the annular groved or relieved area 44 of rod member 40. The surface 46, the surface 64, upper surface 66 of the arm members 60 and the face 38 of the tubular member 36 are parallel when the hold-open rod is in a locked open position to ensure that the compressive loads flow directly through rod 40 and tubular member 36 and do not flow through the latch means 34. The arm members 60 partially encircle the rod member 40 when in a locked position so that if a workman were to accidentally contact with the latch member 48 with a hammer or the like, the latch 48 is precluded from swivelling out of locking engagement with the rod member 40.

OPERATION

When it is desired to raise a hinged section of the nacelle system 10 for maintenance or the like, it will be intended to place the hold open rod 30 in the position as shown in FIG. 2. The hinged section of the nacelle 10 is raised either by jacks or manually, according to the weight of the particular section. While the hinged section is temporarily being held open, the hold open rod 30 is swung around to an operative position through swivable connection 32 for connection of the rod member 40 to the engine casing. The rod 40 is pulled from the tubular member 36 until the locking means 32 is engaged by the arm members 60 entering the annular grove 44 and the rod 40 is connected via a swivable connection 32 to the engine casing. The hold open rod 30 then holds the hinged section open for whatever operations that may be desired to be performed. When it is desired to close the hinged section 20, the hinged section is raised slightly in a predetermined manner by either jacking it further open or raising it manually, and the latch portion 56 is rotated inwardly. As the latch portion is rotated inwardly, the prong arms 60 are then permitted to clear the rod member 40 as seen in FIG. 6, and then permit the rod member 40 to be telescoped within the hollow tubular member 36 in a controlled manner to again return the rod 30 to the position shown in FIG. 3. It will be seen in FIGS. 5 and 6 that the arm members 60 are provided with ground away relieved portions 70 at their outer nose portions to assist in opening of the locking means 34 and permit the arm members 60 to avoid interference with the rod member 40. Similarly, if the lock 34 is in an open position as seen in FIG. 6 and the rod 40 is being telescoped within the tubular member 36, the spring member 54 will drive the arm members 60 into locking engagement with the annular groove 44 of the rod 40. Thus, it is seen that the novel locking feature 34 of the hold open rod 30 permits the rod to be unlocked only when the the hinged section is raised a predetermined distance in order to permit the the prong 58 and associated arm members 60 to clear the groove of the rod member 40 in response to a manual actuation of the latch 56. It is only when these two conditions take place that the hold open rod can be collapsed for storing within the nacelle system 10.

While the invention has been described with reference to a specific enmbodiment, it will be obvious to those skilled in the art that various changes and modifications can be made to the embodiment disclosed without departing from the spirit and scope of the invention as set forth in the claims. For example, the rod 40 could be connected to a hinged section of the nacelle system 10 and the tubular member 36 could instead be connectable to the engine 12. Similarly, while the particular hold open rod 30 and its associated locking feature 34 has been illustrated in the context of a nacelle system for an aircraft engine, its use is not so limited and the hold open rod 30 could be used in other applications where its unique capabilities would be important.

What is claimed is:

1. In a nacelle system for an aircraft jet engine having a plurality of bifurcated sections which are hinged along a longitudinal upper spine and locked together along a longitudinal lower spine, a hold open rod adapted to be collapsible and stowed within the nacelle system during flight and to be extended and locked in a position to hold open a hinged nacelle system section to permit access to the jet engine or elements of the nacelle system as may be required on the ground, the hold open rod comprising:

a tubular member swivably connected at one end to a hinged portion of the nacelle system;

a rod member slidably positioned within the tubular member and swivably connected at one end to the jet engine, said rod member is provided with at least one annular relieved portion having at least one surface normal to the axis of the rod;

locking means secured to the tubular member which is provided with a latch member that selectively lockingly cooperates with the relieved portion of the rod member to lock the hold open rod in an open position for locking a hinged portion of the nacelle system in an open position;

said locking means requiring the hinged portion of the nacelle system to be more fully opened to permit the locking means to be unlocked and the rod member to be collapsed within the tubular member to permit the closing and locking of the hinged nacelle portion and stowing of the rod, said latch member is swivably connected to the tubular member and is biased toward a locking engagement with the rod member and is provided at one end with an open ended prong having outwardly extending curvilinear arm members that are shaped to closely surround the relieved portion of the rod member in locking engagement and is selectively rotatable to an open position to permit telescoping of the rod member within the tubular member only when the hinged nacelle section is raised a predetermined distance said prong and integral arm members are provided with a central annular relieved portion which is shaped to closely surround the outer surface of the tubular member and to provide an inner shoulder having a lower surface adapted to engage the normal surface of the relieved area of the rod member when the latch member is in its locked position and the prong portion and integral arm members extend into the annular relieved portion of the rod member.

2. A hold open rod as described in claim 1 wherein the arm members of the prong portion of the latch are sized to sufficiently surround the rod member when in locking engagement to permit being swivably moved from locking engagement only when the connected hinge portion of the nacelle system is moved upward sufficiently to permit the upper portion of the prong arm members to pass around the relieved portion of the rod member and avoid interference with the rod member thereby permitting the rod member to be telescoped downwardly into the tubular member.

3. The hold open rod as described in claim 2 wherein outer nose portions of the prong arm members are relieved at their lower outer extremities to permit the prong members to more easily clear the inner portion of the relieved portion of the rod member when unlocking the latch in the closing of a hinged portion of a nacelle system.

4. The hold open rod as described in claim 3 wherein a transverse face of the outer end of the tubular member, an upper face of the prong and integral arm members, a lower shoulder of the relieved portion of the prong and integral arm members, and the lower inner surface of the relieved portion of the prong and integral arm members are all parallel when the hold open rod is in its locked hold open position.

5. The hold open rod of claim 4 wherein the tubular member is swivably connected to engine instead of to a a hinged nacelle portion and the rod member is connected to a hinged nacelle portion instead of to the engine.

* * * * *